United States Patent [19]
Ozawa

[11] Patent Number: 6,133,923
[45] Date of Patent: Oct. 17, 2000

[54] METHOD AND APPARATUS FOR TEXTURE DATA

[75] Inventor: Hiroyuki Ozawa, Tokyo, Japan

[73] Assignee: Sony Corporation, Tokyo, Japan

[21] Appl. No.: 08/920,837

[22] Filed: Aug. 29, 1997

[30] Foreign Application Priority Data

Aug. 30, 1996 [JP] Japan .................................. 8-249133

[51] Int. Cl.[7] .................................................. G06T 11/40
[52] U.S. Cl. ........................ 345/430; 345/425; 345/515; 345/521
[58] Field of Search .................................. 345/430, 425, 345/515, 521; 382/285

[56] References Cited

U.S. PATENT DOCUMENTS

| | | | |
|---|---|---|---|
| 5,553,208 | 9/1996 | Murata et al. | 345/425 |
| 5,586,234 | 12/1996 | Sakuraba et al. | 345/430 |
| 5,606,650 | 2/1997 | Kelley et al. | 345/430 |
| 5,751,292 | 5/1998 | Emmot | 345/430 |
| 5,828,382 | 10/1998 | Wilde | 345/501 |
| 5,831,640 | 11/1998 | Wang et al. | 345/521 |
| 5,852,451 | 12/1998 | Cox et al. | 345/509 |
| 5,877,770 | 3/1999 | Hanaoka | 345/430 |
| 5,880,737 | 3/1999 | Griffin et al. | 345/430 |
| 5,987,567 | 11/1999 | Rivard et al. | 711/118 |

*Primary Examiner*—Mark K. Zimmerman
*Assistant Examiner*—Albert K. Lee
*Attorney, Agent, or Firm*—Fulwider Patton Lee & Utecht, LLP

[57] ABSTRACT

A system for reading texture data from a memory without need to use a cache unit in such a manner that the read speed is not affected by the size of the memory, wherein a memory address is supplied to a memory address comparing unit, a memory address comparing unit compares the memory address of the current pixel and the memory address of the immediately preceding adjacent pixel, the compared result being supplied as information to a compared result storing unit which stores the information. A memory accessing unit receives a memory address different from the memory address of the adjacent pixel and reads texture data the corresponding address in a memory, the texture data being stored in a texture data storing unit. A texture data restructuring unit reads texture data from the texture data storing unit corresponding to the information read from the compared result storing unit and restructures the texture data accordingly.

28 Claims, 7 Drawing Sheets

Fig. 6A
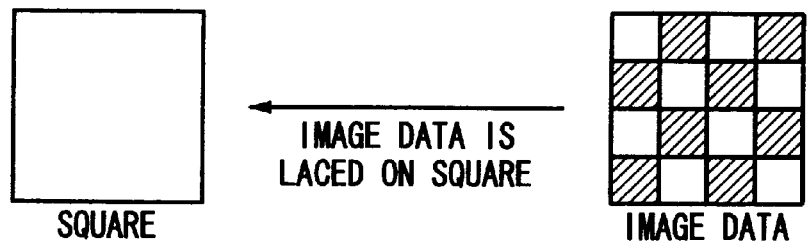
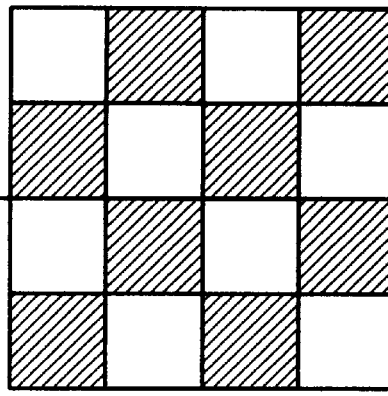
Fig 6B
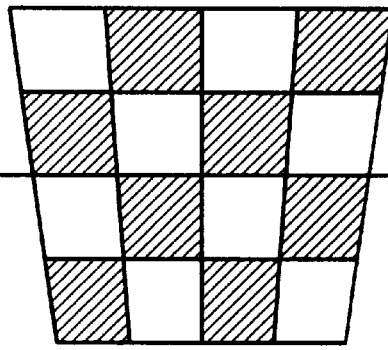
Fig 6C
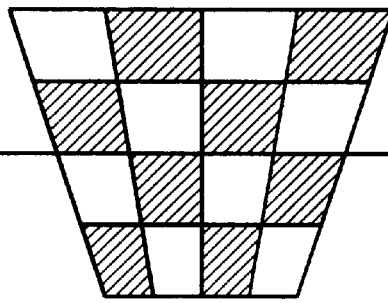
Fig. 6D

METHOD AND APPARATUS FOR TEXTURE DATA

This application claims priority under the International Convention based upon Japanese Patent Application No. P08-249133, filed Aug. 30, 1996.

BACKGROUND OF THE INVENTION

1. Field of the Invention

The present invention relates to a new and improved method and apparatus for reading and rendering texture data for use with a texture mapping technique that substantially improves expression in a three-dimensional computer graphics system. In particular, the present invention can be applied for a variety of fields such as CAD (Computer Aided Designing) systems and game machines.

2. Description of the Related Art

Texture mapping is used to place texture data such as pattern or natural images on an object in computer graphics. This object is typically formed using a plurality of polygons, such as a triangle polygon or a square polygon. Therefore, by using texture mapping, a realistic picture can be generated. For example, consider the state wherein an object in square form mapped texture data is rotating. As mentioned above, since generally an object is formed from a plurality of polygons such as triangles, texture data is mapped as each polygon unit. With respect to such texture data mapping, the texture data is stored in a memory beforehand, and the texture mapping is performed by reading texture data from the memory in accordance with calculated memory addressing.

An example of a conventional texture mapping operation is as follows:

1) Texture coordinates (S1, T1, Q1), (S2, T2, Q2), and (S3, T3, Q3) are designated to vertexes of a triangle.
2) By linearly interpolating the texture coordinates of the vertexes of the triangle, texture coordinates (S, T, Q) of an inner point of the triangle are obtained.
3) By performing dividing operations of U S/Q and V=T/Q, a memory address (U, V) is obtained.
4) Texture data is then read from the memory with the memory address obtained in step 3 and is placed on the triangle.

In a conventional computer graphics system, texture data is mapped in such a manner that a texture data reading apparatus reads texture data from a conventional memory. However, since the read speed of texture data from the memory is not satisfactorily high, the performance of the texture mapping apparatus is restricted.

To solve such a problem, a cache unit that temporarily stores texture data may be disposed between the texture data reading apparatus and the memory. In this case, the data reading apparatus can read texture data from the cache unit at high speed.

In such a structure, when the size of texture data is smaller than the storage capacity of the cache unit, the texture data can be read at high speed. However, when the size of the texture data is larger than the storage capacity of the cache unit, to change texture data in the cache unit, texture data should be read from the memory and then written to the cache unit. Thus, the cache unit does not effectively work as a means for sending capture data at high speed.

In addition, since the circuit scale of the cache unit is large, when it is used, a small scale texture mapping unit cannot be accomplished.

Accordingly, there has been a long existing need for improved methods and apparatus for texture data reading and rendering which obviates the aforedescribed difficulties encountered with systems heretofore available. The present invention clearly fulfills this need.

SUMMARY OF THE INVENTION

Briefly and in general terms, the present invention provides a new and improved texture reading and rendering system for a small scale, high speed texture mapping unit, without the need to use a large scale circuit such as a cache unit.

More particularly, in accordance with the present invention, when a memory address of a pixel for which texture data is read from a memory is the same as a memory address of a pixel adjacent thereto, texture data is not read from the memory and when the memory address of the pixel for which texture data is read from the memory is different from the memory address of the pixel adjacent thereto, texture data that has been read is re-used so as to reduce the frequency of the memory accessing operation.

By way of example, and not necessarily by way of limitation, the present invention provides a texture data reading apparatus for reading texture data to be mapped from a memory, wherein the texture data reading apparatus compares a memory address of a pixel for which texture data is read from the memory and a memory address of a pixel adjacent thereto, accesses the memory with the memory address of the pixel, reads new texture data only when the memory address of the pixel is different from the memory address of the pixel adjacent thereto, and re-uses stored texture data rather than reading new texture data from the memory when the memory address of the pixel is the same as the memory address of the pixel adjacent thereto as long as pixels with the same memory address continue.

The invention as set forth in claim 2 is a texture data reading apparatus for reading texture data to be mapped from a memory, comprising a memory address comparing means for comparing a memory address of a pixel for which texture data is read from the memory and a memory address of a pixel adjacent thereto and determining whether or not to read texture data from the memory, a compared result storing means for storing information that represents whether texture data that is newly read from the memory is used or texture data that has been read from the memory is re-used corresponding to a compared result of the memory address comparing means, a memory accessing means for accessing the memory corresponding to the compared result of the memory address comparing means and for reading texture data from the memory, a texture data storing means for storing the texture data that has been read from the memory by the memory accessing means, and a texture data restructuring means for reading desired texture data from the texture data storing means corresponding to the information stored in the compared result storing means, wherein when a memory address of a pixel for which texture data is read from the memory is the same as a memory address of a pixel adjacent thereto, texture data is not read from the memory, but texture data of pixels with the same address is re-used.

The invention as set forth in claim 4 is a rendering apparatus, comprising a plurality of memories, and a plurality of texture data reading units for reading texture data from the memories, the texture data reading units being connected to the memories in parallel, texture data of a plurality of pixels being read from the memories, wherein each of the texture data reading units compares a memory address of a pixel for which texture data is read from the memory and a memory address of a pixel adjacent thereto, accesses the memory with the memory address of the pixel, reads new texture data only when the memory address of the pixel is different from the memory address of the pixel adjacent thereto, and re-uses stored texture data rather than reading new texture data from the memory when the memory address of the pixel is the same as the memory address of the pixel adjacent thereto as long as pixels with the same memory address continue.

According to the present invention, when a memory address of a pixel for which texture data is read from a memory is the same as a memory address of a pixel adjacent thereto, texture data is not read from the memory. When the memory address of the pixel for which texture data is read from the memory is different from the memory address of the pixel adjacent thereto, texture data that has been read is re-used. Thus, the number of times of the memory accessing operation is reduced.

Hence, the present invention satisfies a long existing need for new and improved simple and efficient methods and apparatus for reading and rendering texture data.

These and other objects and advantages of the invention will become apparent from the following more detailed description, when taken in conjunction with the accompanying drawings of illustrative embodiments.

DESCRIPTION OF THE DRAWINGS

FIGS. 6A–6D are schematic diagrams for explaining the general concepts of texture mapping.

DETAILED DESCRIPTION OF THE PREFERRED EMBODIMENTS

Figure 1:
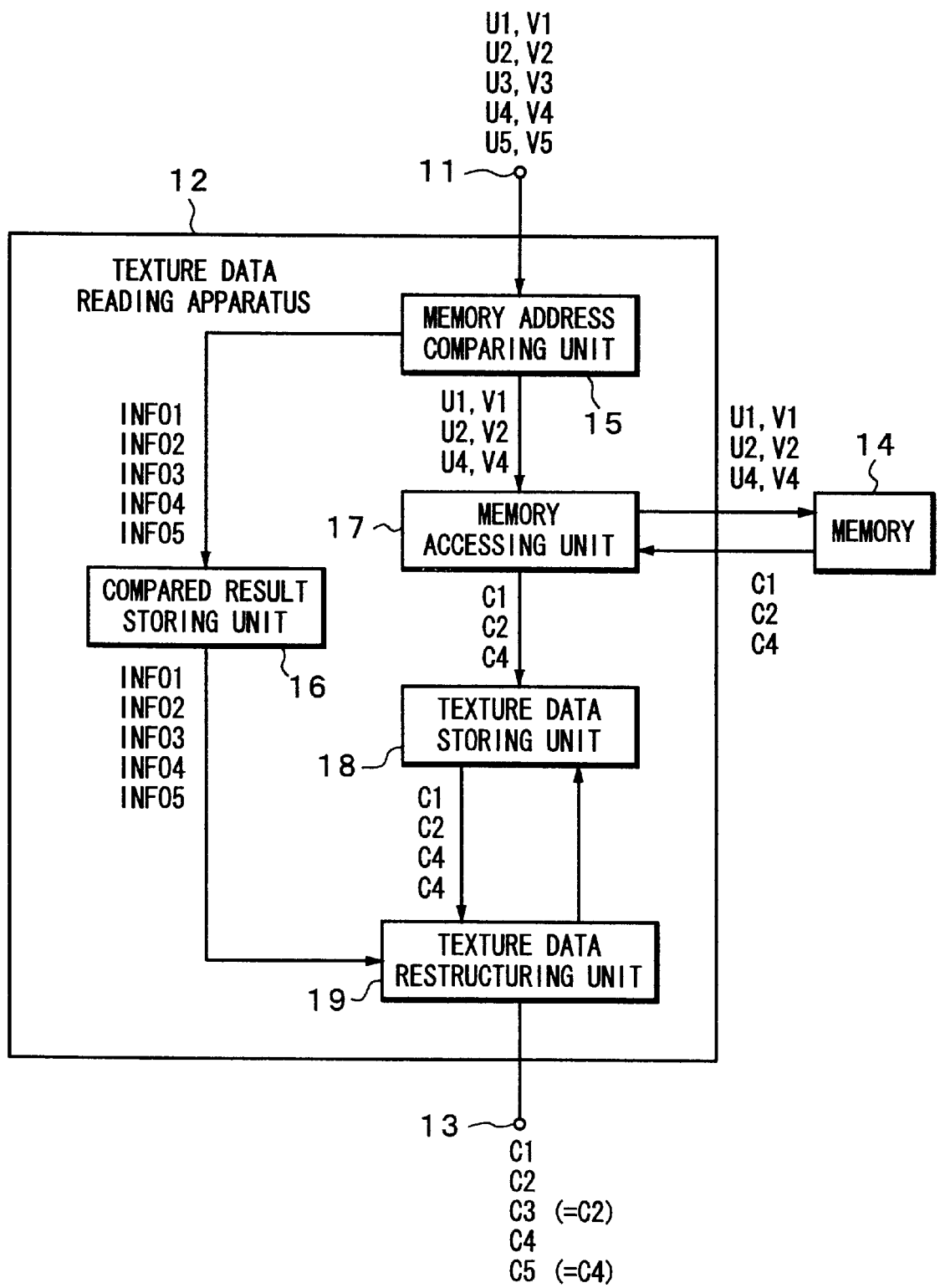
FIG. 1 is a block diagram of an embodiment of the present invention.

Referring now to the accompanying drawings, like reference numerals denote like or corresponding parts throughout the drawing figures.

Figure 7A:
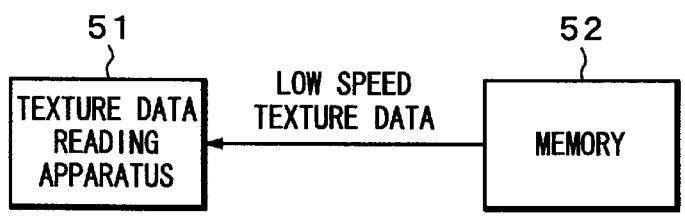
FIGS. 7A and 7B are block diagrams showing the structure of a conventional texture data reading apparatus.
Figure 7B:
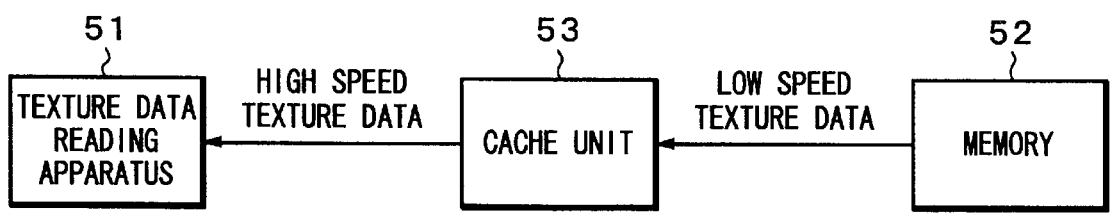

The structure and operation of a conventional texture data mapping, reading and rendering system is illustrated in FIGS. 6, 7A and 7B of the drawings.

Texture mapping is used to place texture data such as pattern or natural images on an object in computer graphics. This object is typically formed using a plurality of polygons, such as a triangle polygon or a square polygon. Therefore, by using texture mapping, a realistic picture can be generated. For example, consider the state wherein an object in square form mapped texture data is rotating. As mentioned above, since generally an object is formed from a plurality of polygons such as triangles, texture data is mapped as each polygon unit. With respect to such texture data mapping, the texture data is stored in a memory beforehand, and the texture mapping is performed by reading texture data from the memory in accordance with calculated memory addressing.

An example of a conventional texture mapping operation is as follows:

1) Texture coordinates (S1, T1, Q1), (S2, T2, Q2), and (S3, T3, Q3) are designated to vertexes of a triangle.
2) By linearly interpolating the texture coordinates of the vertexes of the triangle, texture coordinates (S, T, Q) of an inner point of the triangle are obtained.
3) By performing dividing operations of U S/Q and V=T/Q, a memory address (U, V) is obtained.
4) Texture data is then read from the memory with the memory address obtained in step 3 and is placed on the triangle.

In a conventional computer graphics system, texture data is mapped in such a manner that a texture data reading apparatus 51 reads texture data from a conventional memory 52. However, since the read speed of texture data from the memory 52 is not satisfactorily high, the performance of the texture mapping apparatus is restricted.

To solve such a problem, as shown in FIG. 7B, a cache unit 53 that temporarily stores texture data may be disposed between the texture data reading apparatus 51 and the memory 52. In this case, the data reading apparatus 51 can read texture data from the cache unit 53 at high speed.

In such a structure, when the size of texture data is smaller than the storage capacity of the cache unit, the texture data can be read at high speed. However, when the size of the texture data is larger than the storage capacity of the cache unit, to change texture data in the cache unit, texture data should be read from the memory and then written to the cache unit. Thus, the cache unit does not effectively work as a means for sending capture data at high speed.

In addition, since the circuit scale of the cache unit is large, when it is used, a small scale texture mapping unit cannot be accomplished.

In computer graphics, when an image is drawn, it is divided into scan lines and drawn in the order of the scan lines. Hence, the typical triangle polygon is divided into the successive scan lines for the display. Next, in accordance with the invention, the case of which texture data of one scan line is read from a memory will be described.

As best observed in FIG. 1, the apparatus reads texture data from a memory. The apparatus shown in FIG. 1 is composed of a texture data reading apparatus and a memory 14. The texture data reading apparatus 12 is composed of a memory address comparing unit 15, a compared result storing unit 16, a memory accessing unit 17, a texture data storing unit 18, and a texture data restructuring unit 19. A memory address (U, V) is supplied to the memory address comparing unit 15 through an input terminal 11.

The memory address comparing unit 15 is a memory address comparator that compares the present memory address of a pixel to be considered and for which texture data is read from the memory 14 and the previous memory address of a pixel adjacent thereto and determines whether or not to read texture data from the memory. The compared result is provided to the compared result storing unit 16. Furthermore, the memory address comparing unit 15 selects only the memory address (U, V) of the texture data which should be read from the memory 14, in accordance with the compared result, and then provides the memory accessing unit 17 with the selected memory address (U, V). That is, if the present memory address of the present pixel to be read is different from the previous memory address of the pixel adjacent thereto, the present memory address of the present pixel to be read is provided to the memory accessing unit 17, and the information representing the result is simultaneously provided to the compared result storing unit 16. On the other hand, if the present memory address of the present pixel to be read is the same as the previous memory address of the pixel adjacent thereto, the present memory address of the present pixel to be read is not provided to the memory accessing unit 17. Instead, only the information representing the result is provided to the compared result storing unit 16.

The compared result storing unit 16 is a compared result memory that stores the information representing the result provided from the memory address comparing unit 15. This information represents the result regarding whether to use the texture data which is newly read from the memory or the texture data which has previously been read from the memory.

The memory accessing unit 17 is a memory accessing device that accesses the memory 14 and reads texture data C (U, V) from the memory 14 in accordance with the provided memory address from memory address comparing unit 15.

The texture data storing means 18 is a texture data memory that stores the texture data C (U, V) that has been read from the memory 17 by the memory accessing unit 17.

The texture data restructuring unit 19 is a texture data restructuring device that reads desired texture data C (U, V) from the texture data storing unit 18 in accordance with the compared result information stored in the compared result storing unit 16. That is, if the information from the compared result storing unit 16 represents that the present memory address of the present pixel to be read is the same as the previous memory address of the adjacent pixel, the texture data corresponding to the previous memory address of the pixel adjacent thereto is recursively used in the texture data restructuring unit 19. This operation is next described in further detail.

Thus, in the texture reading apparatus 12, when the present memory address of a present pixel for which texture data is read from the memory 14 is the same as the previous memory address of a pixel adjacent thereto, texture data is not read from the memory 14. Rather, texture data corresponding to the previous memory address of the adjacent pixel that has been read is re-used. However, when the present memory address of a present pixel for which texture data is read from a memory 14 is different from the previous memory address of the pixel adjacent thereto, texture data corresponding to the present memory address of the present pixel is read from the memory 14, and the newly read texture data is used. Accordingly, in the present invention, the number of times the memory is accessed is substantially reduced.

Figure 2A:
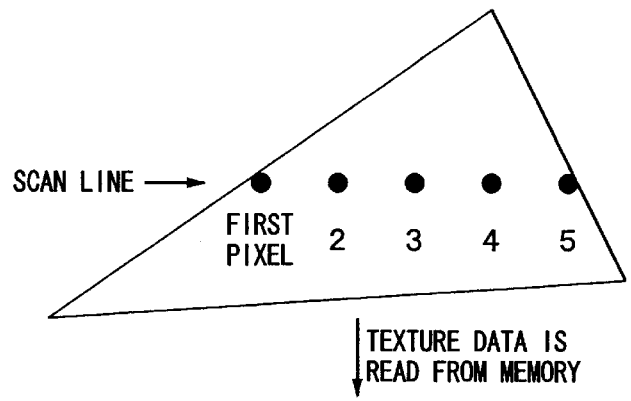
FIGS. 2A and 2B are schematic diagrams for explaining an example of the operation of the embodiment of the present invention.
Figure 2B:
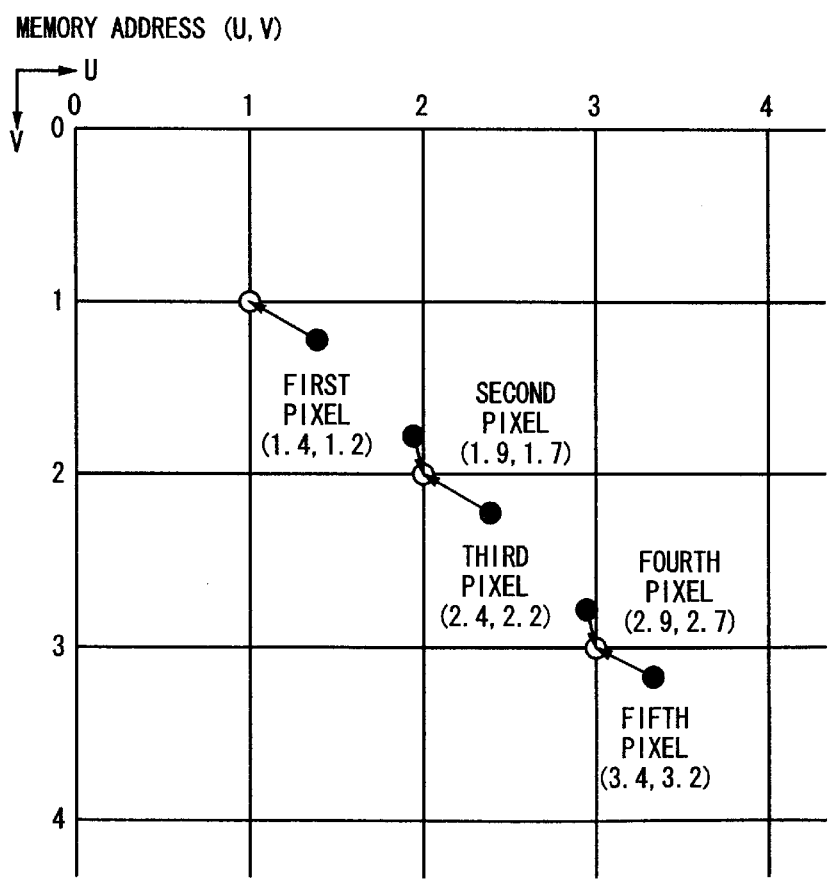

Next, with reference to FIG. 2, an example of the process accomplished by the structure shown in FIG. 1 is described. The memory address comparing unit 15 shown in FIG. 1 compares a present memory address of a present pixel for which texture data is read from the memory and a memory address of an pixel adjacent thereto and determines whether or not to read texture data from the memory.

As shown in FIG. 2, assume that there are five pixels on a scan line and that memory addresses (U, V) (including the decimal part) for reading texture data from the memory 14 are as follows:

(1.4, 1.2), (1.9, 1.7), (2.4, 2.2), (2.9, 2.7), (3.4, 3.2)

The memory address values can be truncated into integers as follows:

(1, 1), (2, 2), (2, 2), (3, 3), (3, 3)

Thus, to obtain texture data for five pixels, the reading operation for the memory 14 should be performed five times.

When a memory address of each pixel and a memory address of a preceding pixel adjacent thereto are compared, the memory address of the third pixel is the same as the memory address of the second pixel. In addition, the memory address of the fifth pixel is the same as the memory address of the fourth pixel. Thus, the memory address comparing unit 15 determines to re-use texture data of the second pixel for the third pixel and texture data of the fourth pixel for the fifth pixel and thereby sends only the following three memory addresses to the memory accessing unit 17 shown in FIG. 1.

(1, 1), (2, 2), (3, 3)

In addition, the memory address comparing unit 15 sends information Info that represents that texture data that is newly read from the memory 14 is used or texture data that has been read from the memory is re-used for each pixel to the compared result storing unit 16.

As an example of the information Info to be sent, assuming that a pixel for which texture data that is newly read from the memory is used is denoted by '1' and that a pixel for which texture data that has been read from the memory is re-used is denoted by '0', the information Info can be represented with one bit. The information Info is composed of data of one bit for each data sample, e.g. one bit, that is Info1 as the compared result of the first pixel, Info2 as the compared result of the second pixel, Info3 as the compared result of the third pixel, Info4 as the compared result of the fourth pixel, and Info5 as the compared result of the fifth pixel. In the example of the pixels on the scan line shown in FIG. 2, the information Info is '1, 1, 0, 1, 0'.

The compared result storing unit 16 shown in FIG. 1 is a FIFO, first in-first out, type of buffer that stores the information Info, which represents that texture data is newly read from the memory is used or texture data of the immediately preceding pixel is re-used, received from the memory address comparing unit 15. The compared result storing unit 16 successively reads the information Info corresponding to a request received from the texture data restructuring unit 19 shown in FIG. 1.

The memory accessing unit 17 shown in FIG. 1 accesses the memory 14 corresponding to the provided memory address of the memory address comparing unit 15 and reads texture data from the memory 14.

In the example of the five pixels on the scan line shown in FIG. 2, texture data is read from the memory 14 in accordance with three memory addresses (1, 1), (2, 2), (3, 3) received from the memory address comparing unit 15.

Assuming that the texture data that has been read is denoted by C (U, V), three texture data C (1, 1), C (2, 2), and C (3, 3) are sent to the texture data storing unit 18 shown in FIG. 1.

The texture data storing unit 18 shown in FIG. 1 is a FIFO, first in-first out, type of buffer that stores texture data read from the memory 14 by the memory accessing unit 17. The texture data stored in the texture data storing unit 18 is successively read in accordance with a request received from the texture data restructuring unit 19.

The texture data restructuring unit 19 shown in FIG. 1 reads desired texture data from the texture data storing unit 18 corresponding to the information stored in the compared result storing unit 16.

In the example of the five pixels on the scan line shown in FIG. 2, the compared result storing unit 16 and the texture data storing unit 18 store the following data.

Compared result storing unit: 1, 1, 0, 1, 0

Texture data storing unit: C (1, 1), C (2, 2), C (3, 3)

Next, in the texture data restructuring unit 19, a method for restructuring texture data for five pixels with the information stored in the compared result storing unit 16 and the texture data storing unit 18 will be described.

First pixel) The information for the first pixel (Info1) is read from the compared result storing unit 16. Since this information represents "1", a first texture data C (1, 1) is read from the texture data storing unit 18 and the read texture data C (1, 1) is used.

Second pixel) Continuously, the information for the second pixel (Info2) is read from the compared result storing unit 16. Since this information also represents "1", a new texture data C (2, 2) is read from the texture data storing units 18 and the read texture data C (2, 2) is used.

Third pixel) Next the information for the third pixel (Info3) is read from the compared result storing unit 16. Since this information also represents "0", a new texture data is not read from the texture data storing unit 18, but instead of the new texture data, the texture data C (2, 2) which has been read, is re-used.

Fourth pixel) Continuously the information for the fourth pixel (Info4) is read from the compared result storing unit 16. Since this information also represents "1", a new texture data C (3, 3) is read from the texture data storing units 18 and the read texture data C (3, 3) is used.

Fifth pixel) Next the information for the fifth pixel (Info5) is read from the compared result storing unit 16. Since this information also represents "0", a new texture data is not read from the texture data storing unit 18, but instead of the new texture data, the texture data C (3, 3) which has been read, is re-used.

In such a manner, the following texture data for five pixels is restructured with the memory accessing operation occurring only three times.

C (1, 1), C (2, 2), C (2, 2), C (3, 3), C (3, 3)

According to the present invention, when the present memory address of a pixel to be read for which texture data is read from the memory is the same as the previous memory address of a pixel adjacent thereto, texture data is not read from the memory. Instead, texture data that has been read for a pixel with the same memory address is re-used. Thus, since the number of cycles of the memory accessing operation is reduced, even if a low speed memory is used, a texture data reading apparatus that operates at high speed is provided.

In addition, the present invention can be applied for the case where the texture data corresponding to the memory address of a pixel to be read is interpolated using the four sets of texture data adjacent to the memory address, as shown in FIG. 3, so as to generate high quality texture data.

Next an example in which the texture data corresponding to the provided memory address of a pixel to be read interpolates from the four sets of texture data with the structure shown in FIG. 1 will be described.

When four adjacent points are interpolated, four sets of texture data are read from the four corresponding memory addresses that are most closely adjacent to a memory address of each current pixel. Assuming that the decimal part of the given memory address is truncated as (U0, V0), texture data is read from four memory addresses (U0, V0), (U0+1, V0), (U0, V0+1), and (U0+1, V0+1).

In the example shown in FIG. 3, texture data should be read with the following 20 memory addresses.

First pixel: (1, 1), (2, 1), (1, 2), (2, 2)

Second pixel: (1, 1), (2, 1), (1, 2), (2, 2)

Third pixel: (2, 2), (3, 2), (2, 3), (3, 3)

Fourth pixel: (2, 2), (3, 2), (2, 3), (3, 3)

Fifth pixel: (3, 3), (4, 3), (3, 4), (4, 4)

The memory address comparing unit 15 shown in FIG. 1 receives the present memory address of the pixel to be read and calculates the four memory addresses neighboring to the present memory address. The memory address comparing unit 15 compares the four memory addresses neighboring to the present memory address of the pixel to be read and the four memory addresses neighboring to the previous memory address of the pixel adjacent thereto, and then eliminates redundant memory addresses as the same memory address. Only different memory addresses which are not removed, are provided to the memory accessing unit 17.

In the example shown in FIG. 3, the memory address comparing unit 15 sends the following 10 memory addresses to the memory accessing unit 17.

First pixel: (1, 1), (2, 1), (1, 2), (2, 2)

Third pixel: (3, 2), (2, 3), (3, 3)

Fifth pixel: (4, 3), (3, 4), (4, 4)

In addition, the memory address comparing unit 15 provides the compared result storing unit 16 with information 1 and information 2 as the information representing the compared result. The information 1 and the information 2 is necessary for the texture data restructuring unit 19 shown in FIG. 1, to restructure the texture data.

The information 1 as the first information is four-bit information that represents that texture data that is newly read from the memory is used or texture data that has been read is re-read for each pixel.

The information 2 as the second information is two-bit information of the least significant bits of U and V of the memory address (U, V) of each pixel.

Figure 3A:
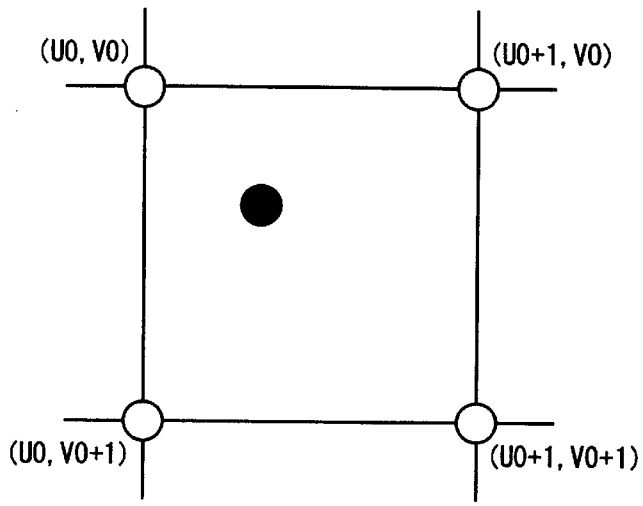
FIGS. 3A and 3B are schematic diagrams for explaining the operation of a four-point interpolating process according to an embodiment of the present invention.
Figure 3B:
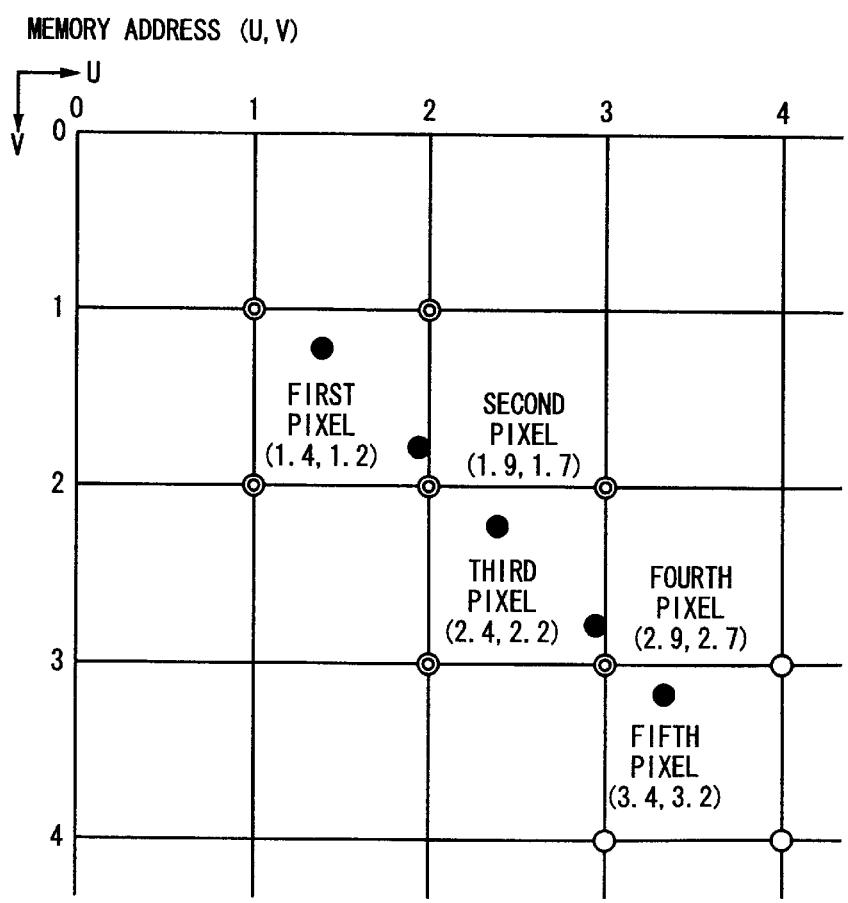

In the example shown in FIG. 3B, the following information Info of each pixel is sent to the compared result storing unit 16. The relation between each information (information 1 and information 2) of the table and the four memory addresses is given in the order of (U0, V0), (U0+1, V0), (U0, V0+1), (U0+1, V0+1).

|  | Information 1 | Information 2 (least significant bit of memory address) |
|---|---|---|
| 1-st pixel | 1111 | (1, 1), (0, 1), (1, 0), (0, 0) |
| 2-nd pixel | 0000 | (1, 1), (0, 1), (1, 0), (0, 0) |
| 3-rd pixel | 0111 | (0, 0), (1, 0), (0, 1), (1, 1) |
| 4-th pixel | 0000 | (0, 0), (1, 0), (0, 1), (1, 1) |
| 5-th pixel | 0111 | (1, 1), (0, 1), (1, 0), (0, 0) |

Hereinafter, for simplicity of explanation, (0, 0), (1, 0), (0, 1), and (1, 1) of the information 2 are denoted by A, B, C, and D, respectively. Thus, the above table is rewritten as follows:

|  | Information 1 | Information 2 |
|---|---|---|
| 1-st pixel | 1111 | DCBA |
| 2-nd pixel | 0000 | DCBA |
| 3-rd pixel | 0111 | ABCD |
| 4-th pixel | 0000 | ABCD |
| 5-th pixel | 0111 | DCBA |

In the aforedescribed example, a pixel for which texture data that is newly read from memory is used, is denoted by "1" and a pixel for which the texture data that has been previously read from the memory is re-used, is denoted by "0".

In the table, at the memory address (U0, V0) of the second pixel, the information 1 represents that the memory is not accessed and that texture data is re-used. In addition, the information 2 represents that the texture data at the memory address (U0, V0) is the same as the memory address (U0+1, V0+1) of the second pixel (first pixel).

The memory accessing unit 17 shown in FIG. 1 reads texture data from the memory in accordance with the memory address (U, V) received from the memory address comparing unit 15 and sends the texture data C (U, V) corresponding to the provided memory address to the texture data storing unit 18 shown in FIG. 1.

In the example shown in FIG. 3B, the memory accessing unit 17 reads texture data C (U, V) from the memory 14 corresponding to the following memory addresses received from the memory address comparing unit 15 and sends the texture data C to the texture data storing unit 18.

Memory Address
First pixel: (1, 1), (2, 1), (1, 2), (2, 2)
Second pixel: (3, 2), (2, 3), (3, 3)
Fifth pixel: (4, 3), (3, 4), (4, 4)
Texture Data
C (1, 1), C (2, 1), C (1, 2), C (2, 2)
C (3, 2), C (2, 3), C (3, 3)
C (4, 3), C (3, 4), C (4, 4)

The texture data storing unit 18 shown in FIG. 1 is a FIFO type buffer that stores the texture data C (U, V) received from the memory accessing unit 17.

When four adjacent points are interpolated, texture data corresponding to four memory addresses of each pixel is stored. Corresponding to the least significant bits of the texture address (U, V), C (0, 0), C (1, 0), C (0, 1), and C (1, 1) are stored in A, B, C, and D that are four FIFO type texture data storing units 18, respectively.

In the example shown in FIG. 3B, the following texture data C (U, V) is stored in A, B, C, and D.

A: C (2, 2), C (4, 4)
B: C (1, 2), C (3, 2), C (3, 4)
C: C (2, 1), C (2, 3), C (4, 3)
D: C (1, 1), C (3, 3)

The texture data restructuring unit 19 shown in FIG. 1 reads desired texture data stored in the texture data storing unit 18 corresponding to information stored in the compared result storing unit 16.

In the method for restructuring texture data, it is determined whether new texture data is read from the texture data storing unit 18 or texture data is re-used in accordance with the information 1 of the compared result storing unit 16. In addition, it is determined from which of A, B, C, or D of the FIFO type texture data storing units 18 texture data is read in accordance with the information 2 of the compared result storing unit 16.

In the example shown in FIG. 3B, information and texture data (U, V) are read from the compared result storing unit 16 and the texture data storing unit 18, respectively, in sequence. Thus, four texture data per pixel (a total of 20 texture data) are restructured.

First pixel)
From compared result storing unit: Information 1 (1111) and information 2 (DCBA)
From Texture data storing unit:
New texture data C (1, 1) is read from D.
New texture data C (2, 1) is read from C.
New texture data C (1, 2) is read from B.
New texture data C (2, 2) is read from A.

[0066]
Second pixel)
From compared result storing unit: Information 1 (0000) and information 2 (DCBA)
From texture data storing unit:
Texture data C (1, 1) read from D is re-used.
Texture data C (2, 1) read from C is re-used.
Texture data C (1, 2) read from B is re-used.
Texture data C (2, 2) read from A is re-used.
Third pixel)
From compared result storing unit: Information 1 (0111) and information 2 (ABCD)
From texture data storing unit:
Texture data C (2, 2) read from A is re-used.
New texture data C (3, 2) is read from B.
New texture data C (2, 3) is read from C.
New texture data C (3, 3) is read from D.
Fourth pixel)
From compared result storing unit: Information 1 (0000) and information 2 (ABCD)
From texture data storing unit:
Texture data C (2, 2) read from A is re-used.
Texture data C (3, 2) read from B is re-used.
Texture data C (2, 3) read from C is re-used.
Texture data C (3, 3) read from D is re-used.
Fifth pixel)
From compared result storing unit: Information 1 (0111) and information 2 (DCBA)
From texture data storing unit:
Texture data C (3, 3) read from D is re-used.
New texture data C (4, 3) is read from C.
New texture data C (3, 4) is read from B.
New texture data C (4, 4) is read from A.

As described above, according to the present invention, since 20 texture data can be restructured with the memory accessing operation of 10 times, even if four adjacent points are interpolated, the number of times of the memory accessing operation can be reduced. Thus, a texture data reading apparatus that operates at high speed can be accomplished.

Figure 4:
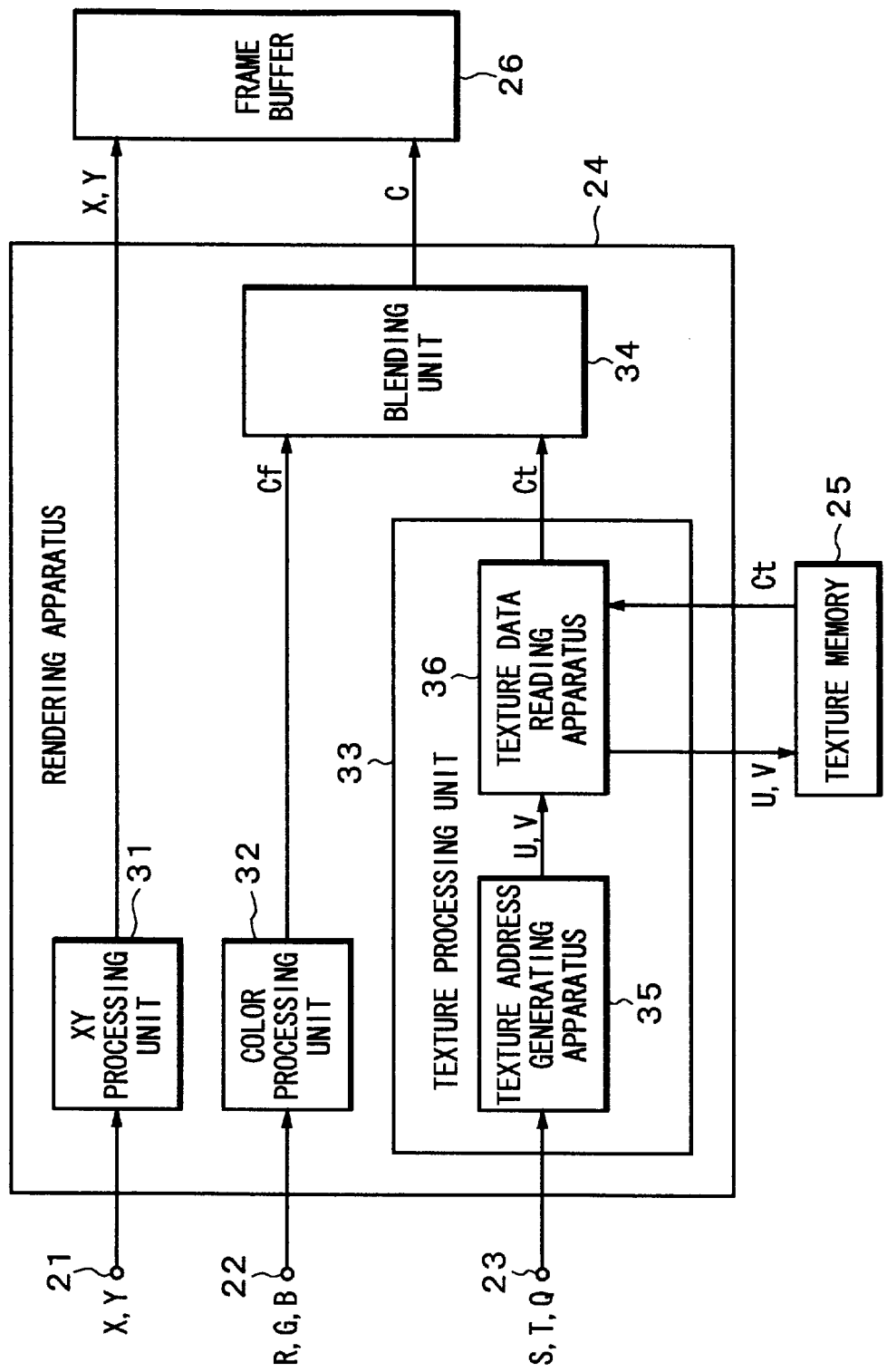
FIG. 4 is a block diagram illustrating a rendering apparatus with a texture data reading apparatus, all according to an embodiment of the present invention.

FIG. 4 is a block diagram showing the structure of a rendering apparatus 40 having the above-described texture data reading apparatus according to an embodiment of the present invention. The rendering apparatus 24 is composed of an XY processing unit 31 that processes XY coordinates (X, Y), a color processing unit 32 that processes color values (R, G, B), a texture processing unit 33 that processes texture coordinates (S, T, Q), and a blending unit 34 that calculates output data of the color processing unit 32 and the texture processing unit 33 and generates a new color. The rendering apparatus 24 is connected to a texture memory 25 that stores texture data and a frame buffer 26 that stores drawing data.

The XY processing unit 31 generates XY coordinates (x, y) in a triangle polygon with XY coordinates (X, Y) of three vertexes of the triangle received from an input terminal 21. The color processing unit 32 linearly interpolates the color values (R, G, B) of the three vertexes of the triangle polygon received from the input terminal 22, obtains a color value Cf of each pixel in the triangle, and outputs the color value Cf to the blending unit 34.

The texture processing unit 33 is composed of a texture address generating unit 35 and a texture data reading apparatus 36 according to the embodiment (shown in FIG. 1) of the present invention. The texture address generating unit 35 generates a texture address (U, V) in a triangle polygon with the texture coordinates (S, T, Q) of the three vertexes of the triangle received from the input terminal 23 and sends the texture address (U, V) to the texture data reading apparatus 36. Thus, the texture data reading apparatus 36 reads texture data Ct from the texture memory 25 and sends the texture data Ct to the blending unit 34.

The blending unit 34 performs adding operation or subtracting operation for the output data Cf of the color processing unit 32 and the output data Ct of the texture processing unit 33 and generates a new color C.

The new color C generated by the above-described processing units is written to the frame buffer 26 corresponding to the XY coordinates (x, y) generated by the XY processing unit 31. Thus, a rendering apparatus is accomplished.

The rendering apparatus 24 can read texture data at high speed with a low speed memory rather than a large scale circuit such as a texture cache. Thus, texture data can be mapped at high speed with a small scale circuit.

Figure 5:
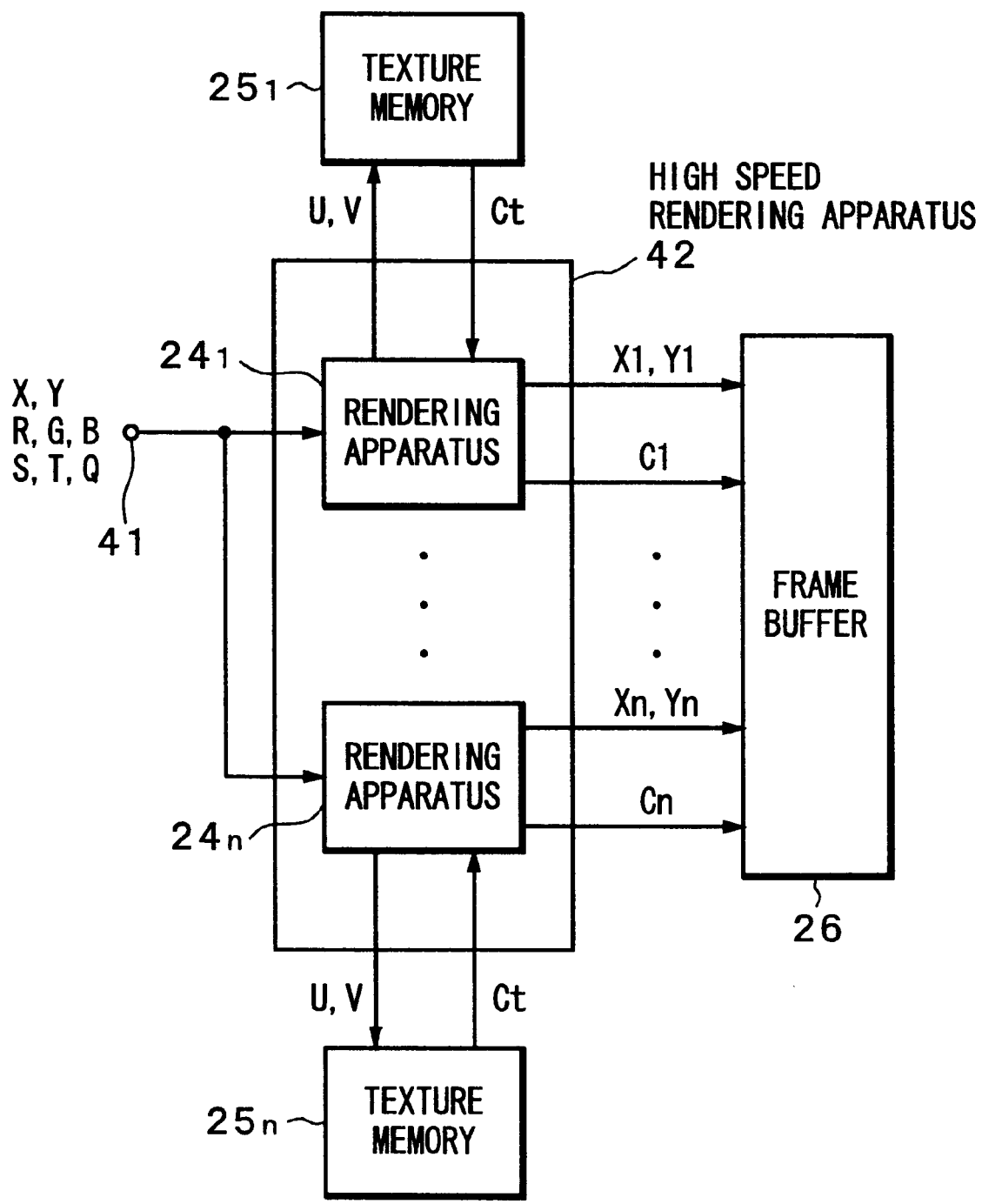
FIG. 5 is a block diagram showing a rendering apparatus with a plurality of texture data reading apparatuses according to another embodiment of the present invention.

In addition, according to the present invention, texture data can be independently read for each scan line. FIG. 5 is a block diagram showing the structure of a rendering apparatus with a plurality of rendering apparatuses 24 shown in FIG. 4.

XY coordinates (X, Y) of three vertexes of a triangle, color values (R, G, B) of the three vertexes of the triangle, and texture coordinates (S, T, Q) of the three vertexes of the triangle are supplied from an input terminal 41 to a high speed rendering apparatus 42. The high speed rendering apparatus 42 has a plurality of rendering apparatuses 24 so as to process different scan lines in parallel. The input signals are supplied to the rendering apparatuses 241 to 24n. Each of the rendering apparatuses 241 to 24n performs the above-described process. The texture memories 251 to 25n generate new colors C1 to Cn and write these colors to a frame buffer 26 corresponding to XY coordinates (x1, y1) to (xn, yn). Thus, a high speed rendering apparatus that processes signals several times higher than the rendering apparatus 24 can be accomplished.

In accordance with the foregoing description of the present invention, when a memory address of a pixel for which texture data is read from a memory is the same as a memory address of a pixel adjacent thereto, texture data is not read from the memory. When the memory address of the pixel for which texture data is read from the memory is different from the memory address of the pixel adjacent thereto, texture data that has been read is re-used so as to reduce the number of times of the memory accessing operation. Thus, a small scale, high speed texture mapping operation can be accomplished without need to use a large scale circuit such as a cache unit.

Hence, the present invention satisfies a long existing need for enhanced image data processing which can more efficiently map, read and render texture data.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. A texture data reading apparatus for reading texture data to be mapped from a memory, comprising:

means for comparing a memory address of a current pixel for which texture data has been previously accessed from the memory and a memory address of another pixel adjacent thereto;

means for accessing new texture data from the memory only when the memory address of the current pixel is different from the memory address of the other pixel adjacent thereto, wherein said means for accessing the memory accesses only new texture data that is actually used for texture mapping;

means for storing current-pixel texture data and new texture data; and means for reading new texture data from the storing means only when the memory address of the current pixel is different from the memory address of the pixel adjacent thereto, and for re-using current-pixel texture data rather than reading new texture data from the storing means when the memory address of the current pixel is the same as the memory address of the pixel adjacent thereto for as long as pixels with the same memory address continue, whereby enhanced efficiency is achieved.

2. A texture data reading apparatus for reading texture data to be mapped from a memory, comprising:

memory address comparing means for comparing a memory address of a current pixel for which texture data has been previously accessed from the memory and a memory address of another pixel adjacent thereto and providing as an output, when the memory address of the current pixel is different then the memory address of the other pixel adjacent thereto, the memory address of the other pixel, the memory address comparing means further providing as an output, information that represents whether new texture data that is newly accessed from the memory will be used or current-pixel texture data that has been previously accessed from the memory will be re-used;

compared result storing means for storing the information memory accessing means responsive to the memory address of the other pixel for accessing from the memory only new texture data that is actually used for texture mapping;

texture data storing means for storing current-pixel texture data and new texture data; and texture data restructuring means for reading desired texture data from said texture data storing means corresponding to the information stored in said compared result storing means, whereby when the memory address of a current pixel for which texture data has been accessed from the memory is the same as the memory address of the other pixel adjacent thereto, new texture data is not accessed from the memory, but current-pixel texture data is re-used, thereby increasing efficiency.

3. A rendering apparatus, comprising:

a plurality of memories; and a plurality of texture data reading units for reading texture data from said memories, said texture data reading units being connected to said memories in parallel, texture data of a plurality of pixels being read from said memories, each of said texture data reading units including:

means for comparing a memory address of a current pixel for which texture data has been previously accessed from the memory and a memory address of another pixel adjacent thereto, means for accessing new texture data from the memory only when the memory address of the current pixel is different from the memory address of the other pixel adjacent thereto, wherein said means for accessing the memory accesses only new texture data that is actually used for texture mapping, means for storing current-pixel texture data and new texture data; and means for reading new texture data from the storing means only when the memory address of the current pixel is different from the memory address of the pixel adjacent thereto, and re-using current-pixel texture data rather than reading new texture data from the storing means when the memory address of the current pixel is the same as the memory address of the pixel adjacent thereto, for as long as pixels with the same memory address continue, whereby efficiency is increased.

4. A method for reading texture data to be mapped from a memory, comprising the steps of:

comparing a present memory address of a current pixel, for which new texture data may need to be accessed from said memory, with a previous memory address of another pixel adjacent thereto, for which texture data has been previously accessed from said memory, to determine whether new texture data needs to be accessed and providing a compared result indicative of such determination; and restructuring texture data by accessing new texture data from the memory in accordance with the present memory address and subsequently reading the new texture data or by re-using texture data accessed and read in accordance with the previous memory address in response to the compared result, wherein only new texture data that is actually used for texture mapping is read from the memory.

5. A method as set forth in claim 4, wherein said step of restructuring accesses new texture data from said memory and subsequently reads the new data in accordance with the present memory address whenever the present memory address is different from the previous memory address, and re-uses texture data accessed and read in accordance with the previous sequential memory address whenever the present memory address is the same as the previous memory address.

6. A method as set forth in claim 5, wherein said compared result provided during said step of comparing comprises information determinative of whether to access new texture data and, if so, selects the memory address to access the new texture data from said memory in response to the compared result.

7. A method as set forth in claim 6, and further comprising the steps of:

storing the information;

accessing new texture data in accordance with the selected memory address; and storing the new texture data accessed by said accessing step;

whereby said restructuring step restructures texture data by reading new texture data or by re-using texture data which has been previously read, in accordance with said information.

8. A method as set forth in claim 4, further comprising:

interpolating data for four adjacent pixels to increase image resolution.

9. A method as set forth in any of claims 5–7, further comprising:

interpolating data for four adjacent pixels to increase image resolution.

10. An apparatus for reading texture data to be mapped from a memory, comprising:

a first memory for storing texture data;

a comparator for comparing a present memory address of a current pixel for which new texture data may need to be accessed from said memory with a previous memory address of another pixel adjacent thereto, for which texture data has been previously accessed from said memory, and determining whether new texture data needs to be accessed, thereby providing a compared result indicative of such determination; and a restructuring device for restructuring texture data by accessing new texture data from said memory in accordance with the present memory address and subsequently reading the new texture data or by re-using texture data accessed and read in accordance with the previous memory address in response to said compared result, wherein only texture data that is actually used for texture mapping is accessed from said memory.

11. An apparatus as set forth in claim 10, wherein said restructuring device is adapted to access new texture data from said memory and subsequently read the data in accordance with the present memory address whenever the present memory address is different from the previous sequential memory address, and to re-use texture data accessed and read in accordance with the previous memory address whenever the present memory address is the same as the previous memory address.

12. An apparatus as set forth in claim 11 wherein said comparator generates information determinative of whether to access new texture data and, if so, selects the memory address to access the new texture data from said first memory in response to said compared result.

13. An apparatus as set forth in claim 12, and further comprising:

a second memory for storing said information;

an accessing device for accessing new texture data from said first memory in accordance with the selected memory address; and a third memory for storing previously-accessed texture data and new texture data accessed by said accessing device;

wherein said restructuring device restructures texture data by reading new texture data from said third memory or by re-using previously-accessed texture data from said third memory, in accordance with the information from said second memory.

14. A rendering apparatus for generating drawing image data, comprising:

a coordinate processing unit for receiving vertex data of a polygon including coordinates of the vertices, and for generating coordinate data representing coordinates in the polygon from the coordinates of the vertices of the polygon;

a color value processing unit for receiving vertex data of the polygon including color values of the vertices and for generating color values in the polygon from the color values of the vertices of the polygon;

a texture memory for storing texture memory;

a texture address generating unit for receiving vertex data of the polygon including texture coordinates of the vertices and for generating texture addresses in the polygon from the texture coordinates of the vertices of the polygon, said texture addresses referring to texture data in said texture memory;

a texture data rendering unit for accessing and reading texture data from said texture memory in accordance with selected texture addresses, wherein only texture data that is actually used for texture mapping is accessed and read from said texture memory; and a blending unit for blending the color values and texture data and generating new color data;

whereby said coordinate data and said new color data are transmitted for drawing an image.

15. A rendering apparatus as set forth in claim 14, wherein said texture data rendering unit further comprises:

a comparator for comparing a present memory address of a current pixel for which new texture data may need to be accessed from said texture memory, with a previous memory address of another pixel adjacent thereto, for which texture data has been previously accessed from said texture memory, and determining whether new texture data needs to be accessed, the present memory address and the previous memory address being provided from said texture address generating unit and the comparator providing as output a compared result indicative of such determination; and a restructuring device for restructuring texture data by accessing new texture data from the texture memory in accordance with the present memory address and subsequently reading the new texture data or by re-using texture data accessed and read in accordance with the previous memory address in response to the compared result from said comparator, wherein only texture data that is actually used for texture mapping is accessed from said memory.

16. An apparatus as set forth in claim 15, wherein said restructuring device accesses new texture data from the texture memory in accordance with the present memory address and subsequently reads the data whenever the present memory address is different from the previous memory address; and re-uses texture data accessed and read in accordance with the previous memory address whenever the present memory address is the same as the previous memory address.

17. An apparatus as set forth in claim 16, wherein said comparator generates information determinative of whether to access new texture data and if so selects the memory address to access the new texture data from said texture memory in response to said compared result.

18. An apparatus as set forth in claim 17, and further comprising:

an information memory for storing said information;

an accessing device for accessing new texture data from said texture memory in accordance with the selected memory address; and a temporary texture memory for storing previously-accessed texture data and new texture data accessed by said accessing device;

wherein said restructuring device restructures texture data by reading new texture data from said temporary texture memory or by re-using previously-accessed texture data from said temporary texture memory, in accordance with the information from said information memory.

19. A rendering apparatus for generating drawing image data, comprising:

a plurality of rendering units disposed in parallel for receiving vertices data of a polygon and for generating data for drawing an image each rendering unit including a texture memory and a reading unit for reading texture data from said texture memory; and wherein each reading unit includes:

a comparator for comparing a present memory address of a current pixel, for which new texture data may need to be accessed from said texture memory with a previous memory address of an adjacent pixel, for which texture data has been previously accessed from said texture memory, and determining whether or not to access the texture data, the present memory address and the previous memory address being provided from a texture address generating unit and the comparator providing as output a compared result indicative of such determination; and a restructuring device for restructuring texture data by accessing new texture data from the texture memory in accordance with the present memory address and subsequently reading the data or by re-using texture data accessed and read in accordance with the previous memory address in response to the compared result provided by said comparator, wherein only new texture data that is actually used for texture mapping is accessed and read from said texture memory.

20. An apparatus as set forth in claim 19, wherein said restructuring device reads new texture data from the texture memory in accordance with the present memory address whenever the present memory address is different from the previous memory address; and re-uses texture data in accordance with the previous memory address whenever the present memory address is the same as the previous memory address.

21. An apparatus as set forth in claim 20, wherein an information memory for storing said information;

an accessing device for accessing new texture data from said texture memory in accordance with the selected memory address; and a temporary texture memory for storing previously-accessed texture data and new texture data accessed by said accessing device;

wherein said restructuring device restructures texture data by reading new texture data from said temporary texture memory or by re-using previously-accessed texture data from said temporary texture memory, in accordance with the information from said information memory.

22. An apparatus as set forth in any of claims 14–21, including means for interpolating data for four pixels adjacent to the current pixel to enhance image resolution.

23. A rendering method for generating drawing image data, comprising the steps of:

receiving vertex data of a polygon including coordinates of the vertices;

generating coordinate data representing coordinates in the polygon from the coordinates of the vertices of the polygon;

receiving vertex data of the polygon including color values of the vertices;

generating color values in the polygon from the color values of the vertices of the polygon;

receiving vertex data of the polygon including texture coordinates of the vertices;

generating texture addresses in the polygon from the texture coordinates of the vertices of the polygon, said texture addresses referring to texture data in a texture memory;

accessing and reading texture data from said texture memory in accordance with selected texture addresses, wherein only texture data that is actually used for texture mapping is accessed and read from said texture memory; and blending the color values and texture data and generating new color data.

24. A rendering method as set forth in claim 23, wherein said texture data rendering step further comprises:

comparing a present memory address of a current pixel for which new texture data may need to be accessed from said texture memory, with a previous memory address of another pixel adjacent thereto, for which texture data has been previously accessed from the texture memory and determining whether new texture data needs to be accessed and providing a compared result indicative of such determination, and restructuring texture data by accessing new texture data from the memory in accordance with the present memory address and subsequently reading the new texture date or by re-using texture data accessed and read in accordance with the previous memory address in response to the compared result from said comparing step, wherein only new texture data that is actually used for texture mapping is accessed and read from said memory.

25. A method as set forth in claim 24, wherein said step of restructuring accesses new texture data from the texture memory in accordance with the present memory address and subsequently read the data whenever the present memory address is different from the previous memory address; and re-uses texture data accessed and read in accordance with the previous memory address whenever the present memory address is the same as the previous memory address.

26. A method as set forth in claim 25, wherein said step of comparing generates information determinative of whether to access new texture data and, if so, selects the memory address to access the new texture data from said texture memory in response to said compared result.

27. A method as set forth in claim 26, and further comprising:

storing said information in an information memory;

accessing new texture data from said texture memory in accordance with the selected memory address; and storing previously-accessed texture data and new texture data accessed by said accessing device;

whereby said step of restructuring restructures texture data by reading new texture data from said temporary texture memory or by re-using previously-accessed texture data, in accordance with the information from said information memory.

28. A method as set forth in any of claims 23–27 further comprising:

interpolating data for four adjacent pixels to increase image resolution.

* * * * *

UNITED STATES PATENT AND TRADEMARK OFFICE
CERTIFICATE OF CORRECTION

PATENT NO. : 6,133,923
DATED : October 17, 2000
INVENTOR(S) : Hiroyuki Ozawa

Page 1 of 1

It is certified that error appears in the above-identified patent and that said Letters Patent is hereby corrected as shown below:

Title page,
Item [54], change Title, "[54] METHOD AND APPARATUS FOR TEXTURE DATA", to read -- [54] METHOD AND APPARATUS FOR TEXTURE DATA MAPPING USING ABSTRACT-PIXEL ADDRESS COMPARISON --.

Column 1,
Line 41, change "U S/Q", to read -- U=S/Q --.

Column 4,
Line 13, change "U S/Q", to read -- U=S/Q --.

Column 6,
Lines 33, 48 and 66, change "FIG. 2", to read -- FIG. 2A --.

Column 7,
Line 51, change "FIG. 3", to read -- FIG. 3B --.

Column 8,
Line 14, change "FIG. 3", to read -- FIG. 3B --.
Line 33, change "FIG. 3B", to read -- FIG. 3A --.

Signed and Sealed this

Twenty-fifth Day of December, 2001

*Attest:*

*Attesting Officer*

JAMES E. ROGAN
*Director of the United States Patent and Trademark Office*